United States Patent
Bordeianu (10) Patent No.: US 8,777,231 B2
(45) Date of Patent: *Jul. 15, 2014

(54) CHUCK

(71) Applicant: Jacobs Chuck Manufacturing Company, Clemson, SC (US)

(72) Inventor: Eugen A. Bordeianu, Seneca, SC (US)

(73) Assignee: Apex Brands, Inc., Sparks, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/778,246

(22) Filed: Feb. 27, 2013

(65) Prior Publication Data

US 2013/0168930 A1    Jul. 4, 2013

Related U.S. Application Data

(63) Continuation of application No. 13/251,747, filed on Oct. 3, 2011, now Pat. No. 8,387,995, which is a continuation of application No. 12/951,154, filed on Nov. 22, 2010, now Pat. No. 8,029,000, which is a continuation of application No. 11/476,379, filed on Jun. 28, 2006, now Pat. No. 7,837,200.

(60) Provisional application No. 60/696,009, filed on Jul. 1, 2005.

(51) Int. Cl.
*B23B 31/16* (2006.01)

(52) U.S. Cl.
USPC .............................. 279/62; 279/140; 279/902

(58) Field of Classification Search
USPC ...................... 279/60–65, 140, 902
IPC ...................................................... B23B 31/16
See application file for complete search history.

(56) References Cited

U.S. PATENT DOCUMENTS 573,189 A    12/1896  Vogel
2,253,345 A  *  8/1941  Palmgren ..................... 279/60

(Continued)

FOREIGN PATENT DOCUMENTS

DE    4438991    5/1996
EP    0468128    1/1991

(Continued)

OTHER PUBLICATIONS

Chinese Patent Office First Office Action dated Nov. 7, 2008, for co-pending Chinese Patent Application No. 2006101422275.

(Continued)

*Primary Examiner* — Eric A Gates
(74) *Attorney, Agent, or Firm* — Nelson Mullins Riley & Scarborough, LLP (57) ABSTRACT

A chuck for use with a driver having a rotatable drive shaft, the chuck including a body having a nose section and a tail section, the tail section being configured to rotate with the drive shaft and the nose section having an axial bore. A plurality of jaws is movably disposed with respect to the body and in communication with the axial bore. A first sleeve is rotatably mounted to the body in operative communication with the jaws so that rotation of the sleeve moves the jaws either toward a longitudinal center axis of the axial bore or away from the longitudinal center axis. A second sleeve is rotatably mounted to the body and is movable between a first position in which the second sleeve is rotatably fixed to the body and a second position in which the second sleeve is rotatable about the body. The second sleeve moves in a direction transverse to the longitudinal center axis of the axial bore when moving between the first position and the second position.

13 Claims, 6 Drawing Sheets

(56) References Cited

U.S. PATENT DOCUMENTS

| | | | | |
|---|---|---|---|---|
| 2,544,088 | A * | 3/1951 | Hollis | 279/60 |
| 4,456,271 | A * | 6/1984 | Kern et al. | 279/91 |
| 4,607,855 | A * | 8/1986 | Rohm | 279/62 |
| 4,695,065 | A * | 9/1987 | Komatsu et al. | 279/60 |
| 5,044,643 | A | 9/1991 | Nakamura | |
| 5,125,673 | A * | 6/1992 | Huff et al. | 279/60 |
| 5,172,923 | A | 12/1992 | Nakamura | |
| 5,193,824 | A * | 3/1993 | Salpaka | 279/60 |
| 5,232,230 | A | 8/1993 | Lin | |
| 5,253,879 | A | 10/1993 | Huff et al. | |
| 5,431,419 | A | 7/1995 | Mack | |
| 5,458,345 | A | 10/1995 | Amyot | |
| 5,499,829 | A * | 3/1996 | Rohm | 279/62 |
| 5,499,830 | A | 3/1996 | Schnizler | |
| 5,573,254 | A | 11/1996 | Huff et al. | |
| 5,624,125 | A | 4/1997 | Rohm | |
| 5,741,016 | A | 4/1998 | Barton et al. | |
| 5,765,839 | A * | 6/1998 | Rohm | 279/62 |
| 5,816,582 | A | 10/1998 | Steadings et al. | |
| 5,829,761 | A | 11/1998 | Rohm | |
| 5,924,702 | A | 7/1999 | Huff et al. | |
| 5,957,469 | A | 9/1999 | Miles et al. | |
| 6,070,884 | A | 6/2000 | Mack | |
| 6,260,856 | B1 | 7/2001 | Temple-Wilson | |
| 6,341,783 | B1 | 1/2002 | Rohm | |
| 6,390,481 | B1 | 5/2002 | Nakamuro | |
| 6,540,236 | B2 * | 4/2003 | Aultman et al. | 279/61 |
| 6,550,785 | B2 | 4/2003 | Rohm | |
| 6,554,289 | B1 | 4/2003 | Lin | |
| 6,572,310 | B2 | 6/2003 | Temple-Wilson | |
| 6,575,478 | B2 | 6/2003 | Rohm et al. | |
| 6,581,942 | B2 | 6/2003 | Rohm | |
| 6,843,484 | B2 * | 1/2005 | Schroeder | 279/60 |
| 6,848,691 | B2 | 2/2005 | Yang et al. | |
| 6,860,488 | B2 | 3/2005 | Mack | |
| 6,902,172 | B2 | 6/2005 | Rohm | |
| 7,125,021 | B2 | 10/2006 | Tan | |
| 7,128,324 | B2 | 10/2006 | Yang et al. | |
| 7,249,770 | B2 | 7/2007 | Yang et al. | |
| 7,296,803 | B2 | 11/2007 | Yang et al. | |
| 7,451,990 | B2 | 11/2008 | Young | |
| 7,472,913 | B2 | 1/2009 | Gong et al. | |
| 7,748,719 | B2 | 7/2010 | Gong et al. | |
| 2004/0004329 | A1 | 1/2004 | Schroeder | |
| 2004/0227309 | A1 | 11/2004 | Rohm | |
| 2006/0232023 | A1 | 10/2006 | Yaksich | |

FOREIGN PATENT DOCUMENTS

| | | |
|---|---|---|
| EP | 0530431 | 1/1992 |
| EP | 0677348 | 12/1994 |
| EP | 0674960 | 2/1995 |
| EP | 0674961 | 2/1995 |
| EP | 0710518 | 5/1996 |
| EP | 0710519 | 5/1996 |
| EP | 0710520 | 5/1996 |
| EP | 0785041 | 7/1997 |
| EP | 1029621 | 8/2000 |
| EP | 1043100 | 10/2000 |
| EP | 1055472 | 11/2000 |
| EP | 1170078 | 1/2002 |
| EP | 1170079 | 1/2002 |
| EP | 1224993 | 7/2002 |
| EP | 1302266 | 4/2003 |
| EP | 1371435 | 12/2003 |
| EP | 1371436 | 12/2003 |
| EP | 1452255 | 9/2004 |
| GB | 2340422 | 2/2000 |
| GB | 2389809 | 12/2003 |
| GB | 2408707 | 6/2005 |
| WO | 2006037063 | 4/2006 |

OTHER PUBLICATIONS

Chinese Patent Office Second Office Action dated Apr. 3, 2009, for co-pending Chinese Patent Application No. 2006101422275.

U.K. Intellectual Property Office First Office Action dated Jan. 8, 2010, for co-pending GB Patent Application No. 0613133.8.

Office Action issued by German Patent and Trade Mark Office dated Mar. 10, 2010, for co-pending German Patent Application No. 10 2006 030 572.8-14.

* cited by examiner

CHUCK

CLAIM OF PRIORITY

This application is a continuation of U.S. patent application Ser. No. 13/251,747, filed Oct. 3, 2011, now U.S. Pat. No. 8,387,995, which is a continuation of U.S. patent application Ser. No. 12/951,154, filed Nov. 22, 2010, now U.S. Pat. No. 8,029,000, which is a continuation of U.S. patent application Ser. No. 11/476,379, filed Jun. 28, 2006, now U.S. Pat. No. 7,837,200, which claims priority to U.S. Provisional Patent Application No. 60/696,009 filed Jul. 1, 2005, the entire disclosures of which are incorporated by reference herein.

TECHNICAL FIELD

The present invention relates generally to chucks for use with drills or with electric or pneumatic power drivers. More particularly, the present invention relates to a chuck of the keyless type that may be tightened or loosened by hand or actuation of the driver motor.

BACKGROUND OF THE INVENTION

Hand, electric, and pneumatic tool drivers are well known. Although twist drills are the most common tools on such drivers, the tools may also comprise screwdrivers, nut drivers, burrs, mounted grinding stones and other cutting or abraiding tools. Since the tool shanks may be of varying diameter or of polygonal cross section, the device is usually provided with a chuck that is adjustable over a relatively wide range. The chuck may be attached to the driver by a threaded or tapered bore.

A variety of chucks have been developed in the art. In an oblique jawed chuck, a chuck body includes three passageways disposed approximately 120° apart from each other. The passageways are configured so that their center lines meet at a point along the chuck axis forward of the chuck. The passageways constrain three jaws that are movable in the passageways to grip a cylindrical or polygonal tool shank disposed approximately along the chuck center axis. The chuck includes a nut that rotates about the chuck center and that engages threads on the jaws so that rotation of the nut moves the jaws in either direction within the passageways. The body is attached to the driveshaft of the driver and is configured so that rotation of the body in one direction with respect to the nut forces the jaws into gripping relationship with the tool shank, while rotation in the opposite direction releases the gripping relationship. The chuck may be keyless if it is rotated by hand. Examples of such chucks are disclosed in U.S. Pat. Nos. 5,125,673 and 5,193,824, the entire disclosures of which are incorporated by reference herein. Various configurations of keyless chucks are known in the art and are desirable for a variety of applications.

SUMMARY OF THE INVENTION

An embodiment of the present invention provides a chuck for use with a manual or powered driver having a rotatable drive shaft. The chuck includes a generally cylindrical body having a nose section and a tail section, the tail section is configured to rotate with the drive shaft and the nose section has an axial bore formed therein. A plurality of jaws is movably disposed with respect to the body and in communication with the axial bore. A first sleeve is rotatably mounted to the body in operative communication with the jaws so that rotation of the sleeve in a closing direction moves the jaws toward a longitudinal center axis of the axial bore and rotation of the sleeve in an opening direction moves the jaws away from the longitudinal center axis. A second sleeve is rotatably mounted to the body, the second sleeve being selectively movable between a first position in which the second sleeve is rotatably fixed to the body and a second position in which the second sleeve is rotatable about the body. The second sleeve moves in a direction transverse to the longitudinal center axis of the axial bore when moving between the first position and the second position.

Another embodiment of the present invention provides a chuck for use with a manual or powered driver having a rotatable drive shaft. The chuck includes a generally cylindrical body having a nose section and a tail section, the tail section is configured to rotate with the drive shaft, and the nose section has an axial bore formed therein. A first set of locking teeth is disposed on the body. A plurality of jaws is movably disposed with respect to the body and in communication with the axial bore. A nut is rotatably mounted about the body and in operative communication with the jaws so that rotation of the nut in a closing direction moves the jaws toward a longitudinal center axis of the axial bore and rotation of the nut in an opening direction moves the jaws away from the longitudinal center axis. A first sleeve is rotatably mounted to the body in operative communication with the nut and is rotatable over a limited angular distance between a first angular position and a second angular position with respect to the nut. A second sleeve includes a second set of locking teeth and the second sleeve is rotatably mounted to the body and selectively movable between a first position in which the second sleeve is rotatably fixed to the body by the first and second locking teeth and a second position in which the second sleeve is rotatable about the body. The second sleeve moves in a direction transverse to the longitudinal center axis of the axial bore when moving between the first position and the second position. When the first sleeve is in the first angular position the second sleeve is in the first position and when the first sleeve is in the second angular position the second sleeve is in the second position.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the present disclosure.

Figure 1:
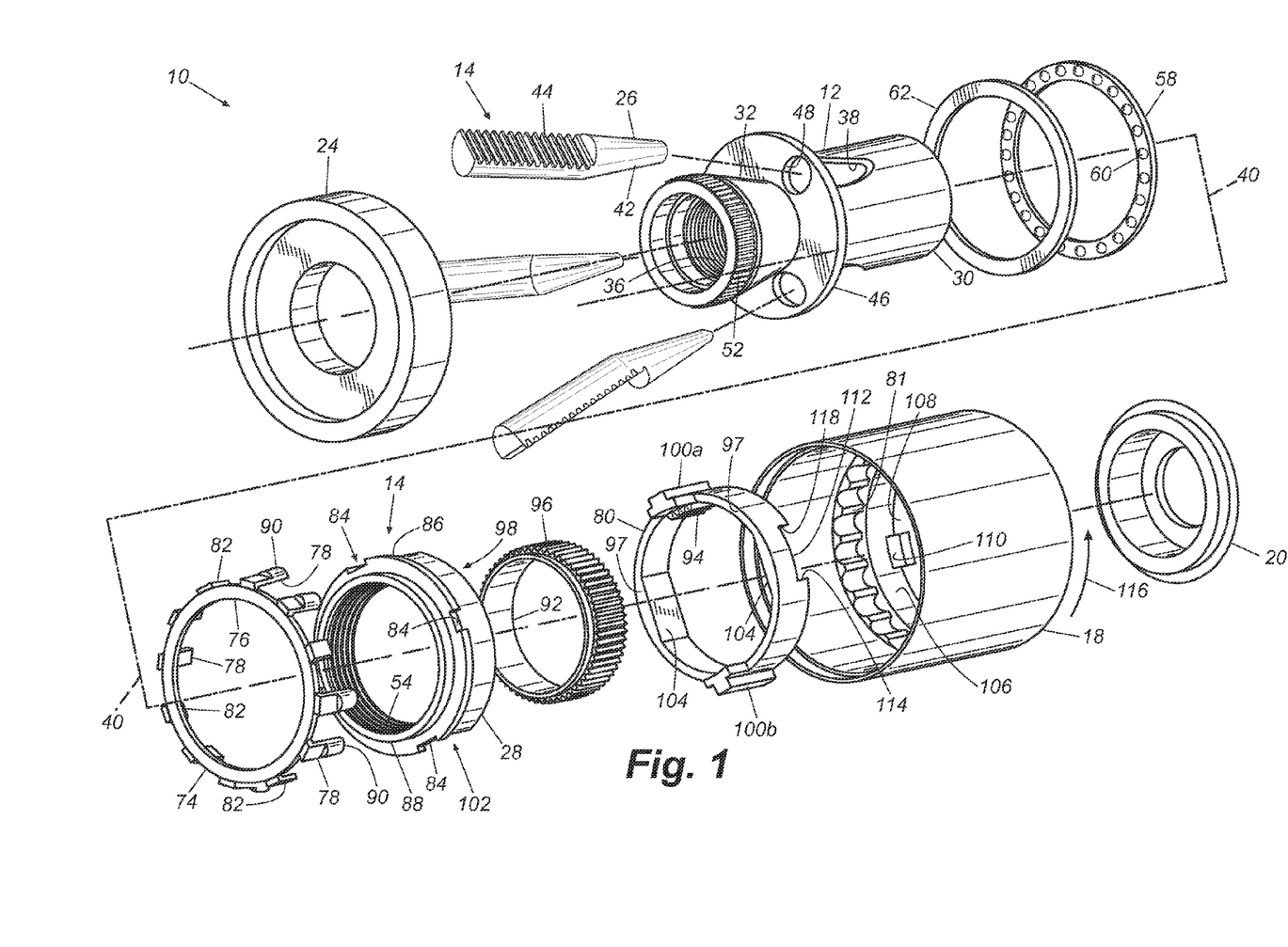
FIG. 1 is an exploded perspective view of a chuck in accordance with an embodiment of the present invention.
Figure 2:
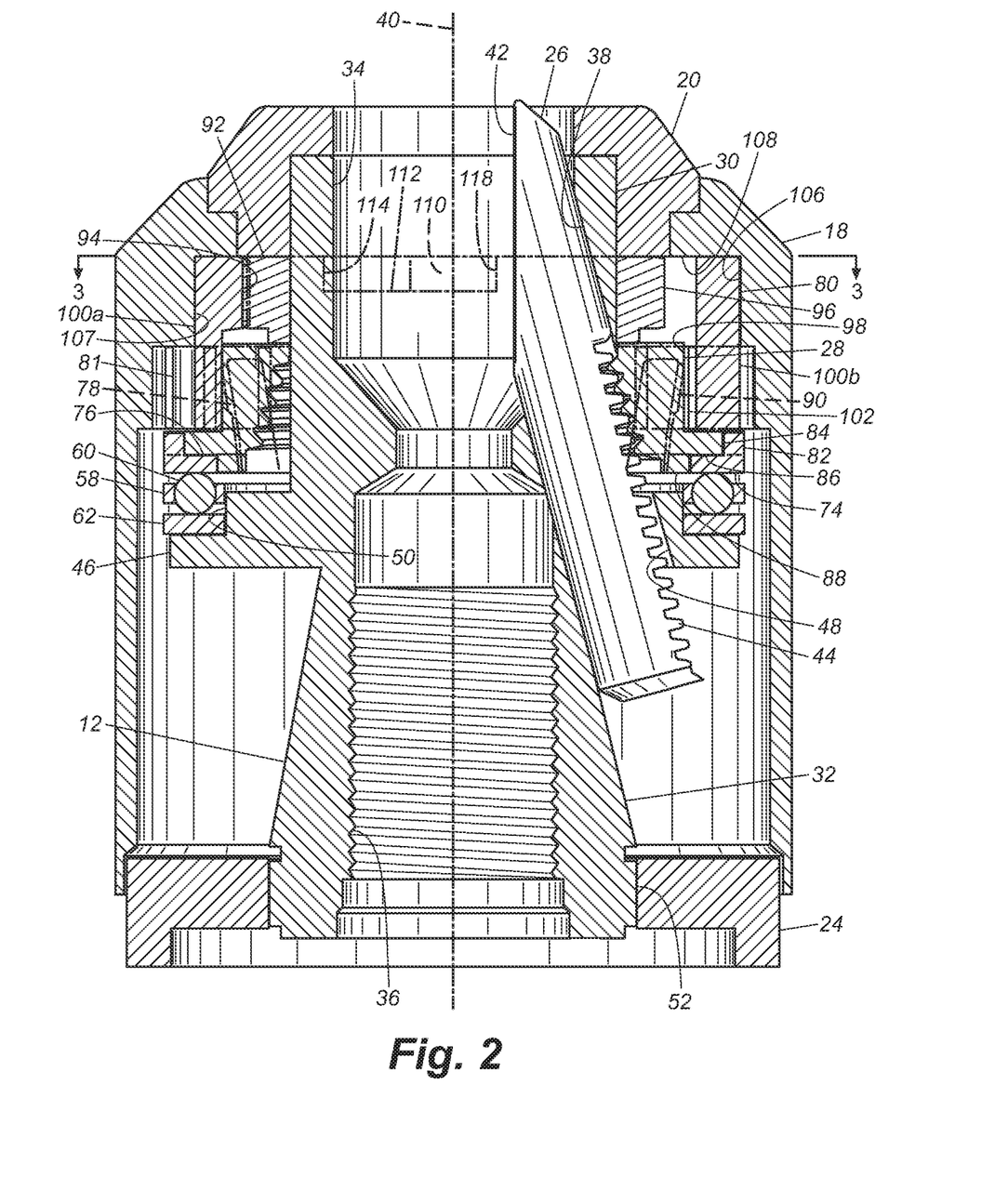
FIG. 2 is a longitudinal view, in cross-section, of the chuck shown in FIG. 1.

Referring to FIGS. 1 and 2, a chuck 10 in accordance with the present invention includes a body 12, a gripping mechanism, generally 14, a sleeve 18, and a nose piece 20. In the embodiment illustrated in FIGS. 1 and 2, gripping mechanism 14 includes a nut 28 and a plurality of jaws 26. Body 12 is generally cylindrical in shape and comprises a nose or forward section 30 and a tail or rearward section 32. An axial bore 34 formed in forward section 30 is dimensioned somewhat larger than the largest tool shank that chuck 10 is designed to accommodate. A threaded bore 36 is formed in tail section 32 and is of a standard size to mate with a drive shaft of a powered or hand driver, for example a power drill having a spindle. The bores 34 and 36 may communicate at a central region of body 12. While a threaded bore 36 is illustrated, such bore is interchangeable with a tapered bore of a standard size to mate with a tapered drive shaft. Furthermore, body 12 may be formed integrally with the drive shaft.

Body 12 defines three passageways 38 that accommodate jaws 26. Each jaw is separated from each adjacent jaw by an arc of approximately 120°. The axes of passageways 38 and jaws 26 are angled with respect to the chuck center axis 40 and meet at a common point. Each jaw 26 has a tool engaging face 42 generally parallel to chuck axis 40 and threads 44 formed on the jaw's opposite or outer surface that may be constructed in any suitable type and pitch.

Body 12 includes a thrust ring 46 that, in a preferred embodiment, may be integral with body 12. In an alternate embodiment, thrust ring 46 may be a separate component from body 12 that is axially and rotationally fixed to the chuck body by interlocking tabs, press fitting or other suitable connection means. Thrust ring 46 includes a plurality of jaw guideways 48 formed around its circumference to permit retraction of jaws 26 therethrough and also includes a ledge portion 50 to receive a bearing assembly as described below.

Body tail section includes a knurled surface 52 that receives a dust cover 24 in a press fit fashion. Dust cover 24 could also be retained through a press fit without knurling, by use of a key or by crimping, staking, riveting, threading or any other suitable method of securing the dust cover to the body. The chuck as described in the present embodiment may be used with a power driver that includes a spindle lock feature to enable actuation of the chuck by sleeve 18 when the spindle is rotationally fixed by the spindle lock. Alternatively, dust cover 24 may be replaced by a rear sleeve rotationally secured to body tail section 32 in a similar manner by which an operator may grip and rotationally secure the body while turning sleeve 18 to drive nut 28 as described below.

Nut 28, which in the illustrated embodiment is a unitary nut, defines female threads 54 located on an inner circumference of the nut and is received over the central part of body 12 proximate thrust ring 46. A bearing washer 62 and an annular bearing cage 58 are received between thrust ring 46 and nut 28. Bearing cage 58 holds a plurality of balls 60 that facilitate the nut's rotation relative to the chuck body.

Preferably, sleeve 18 is molded or otherwise fabricated from a structural plastic such as a polycarbonate, a filled polypropylene, e.g. a glass-filled polypropylene, or a blend of structural plastic materials. Other composite materials such as graphite-filled polymerics may also be suitable in certain environments. It should be appreciated by one skilled in the art that the materials from which the chuck of the present invention are fabricated will depend on the end use of the chuck, and the above materials are provided by way of example only.

The outer circumferential surface of sleeve 18 may be knurled or may be provided with longitudinal ribs or other protrusions to enable the operator to grip it securely. In like manner, the circumferential surface of a rear sleeve (if provided) may be knurled or ribbed if desired. Nose piece 20 is press fit to body nose section 30 and retains sleeve 18 against forward axial movement. Sleeve 18 is secured in the rearward axial direction by a lock ring 80 and nut 28. Nose piece 20 may be coated with a non-ferrous metallic coating to prevent rust and to enhance its appearance. Examples of suitable coatings include zinc or nickel, although it should be appreciated that any suitable coating could be utilized.

As described in more detail below, sleeve 18 rotationally drives nut 28 with respect to the body, thereby moving jaws 26 axially within passageways 38 due to the engagement of jaw threads 44 and nut threads 54. The direction of axial movement of jaws 26 depends on the rotational direction of sleeve 18 and nut 28 with respect to body 12. If a tool, such as a drill bit, is inserted into bore 34, the sleeve and nut may be rotated about chuck axis 40 in a closing direction 116 (FIG. 3A) so that jaws 26 move to a closed position at which the jaws' tool engaging surfaces 42 grippingly engage the tool. Rotation of sleeve 18 and nut 28 about axis 40 in the opposite or opening direction 117 (FIG. 3B) moves the jaws axially rearward out of the closed position to an open position.

Chuck 10 also includes a tightening torque indicator comprising an annular ring 74 and ratchet teeth 81. Annular ring 74 defines an inwardly extending flange 76 seated on a shoulder 88 extending rearwardly from nut 28 and flush against a rearward face of a flange 86 that extends radially outward from the nut's primary outer circumferential surface. Four retaining tabs 82 are spaced evenly about the periphery of flange 76 and extend forward into corresponding notches 84 in flange 86 so that ring 74 is rotationally fixed to nut 28. A plurality of pawls 78 extend from flange 76 over flange 86 and are biased radially outward so that the pawls' distal ends 90 engage ratchet teeth 81.

The engagement between pawls 78 and ratchet teeth 81 rotationally couples sleeve 18 to ring 74. The engagement between annular ring 74 and nut 28 at tabs 82 and notches 84 thus rotationally couples sleeve 18 to nut 28 during normal operation. That is, when opening and closing the chuck, torque applied by the user's hand at sleeve 18 transfers to ring 74 through teeth 81 and pawls 78 and then to nut 28 through the engagement of tabs 82 and notches 84.

A toothed ring 92 is pressed onto body 12 forward of nut 28. Lock ring 80 is disposed about body 12 and toothed ring 92 so that a plurality of locking teeth 94 radially oppose a series of teeth 96 disposed about the outer circumference of ring 92. A rearward face 97 of ring 80 abuts a front face 98 of nut 28, and two tabs 100a and 100b that extend rearwardly from lock ring 80 are received in corresponding grooves 102 in the outer surface of nut 28 so that lock ring 80 is rotationally fixed to the nut.

Lock ring 80 is slightly elliptical in shape so that the width of its inner diameter between tabs 100a and 100b is slightly greater than the outer diameter of ring 92 at the outer edges of teeth 96. Flats 104 on opposite sides of the inner diameter of lock ring 80 (90° offset from tabs 100a and 100b) abut the outer diameter of teeth 96. Flats 104 ride on ring 92 as the lock ring is moved in the radial direction with respect to axis 40 between a first position (FIG. 3A), in which teeth 94 engage teeth 96, and a second position (FIG. 3B), in which teeth 94 are disengaged from teeth 96.

Figure 3A:
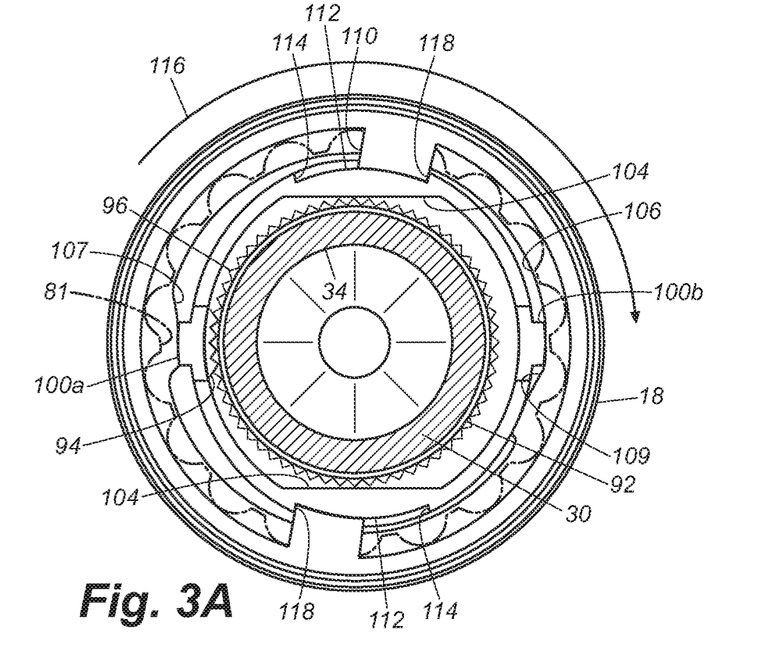
FIG. 3A is a cross-sectional view of the chuck shown in FIG. 2 along line 3-3.
Figure 3B:
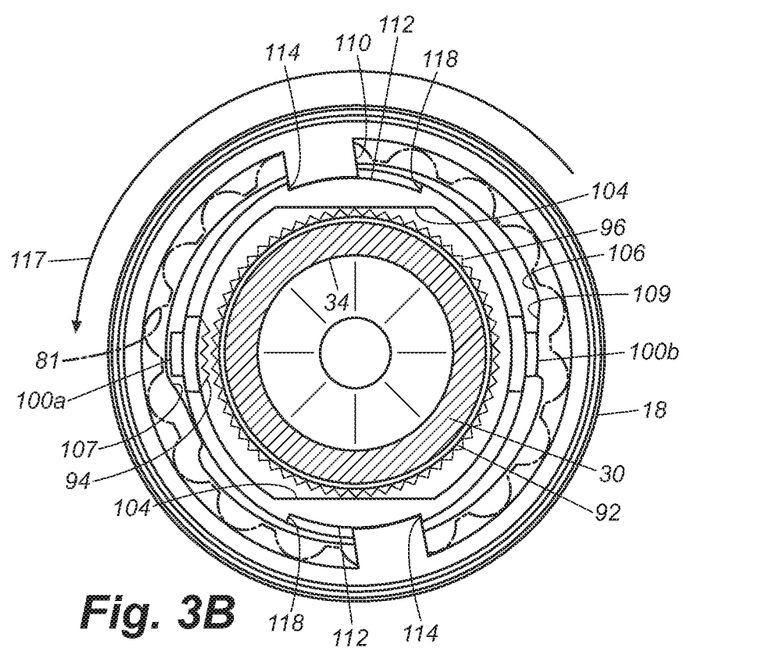
FIG. 3B is a sectional view of the chuck shown in FIG. 2 along line 3-3.

Referring also to FIGS. 3A and 3B, an annular area 106 between ratchet teeth 81 and a radially inward extending lip 108 in the inner diameter of sleeve 18 defines opposing cam surfaces 107 and 109 that engage tabs 100a and 100b, respectively. Sleeve 18 is rotatable with respect to lock ring 80 between two positions at which the cam surfaces drive lock ring 80 via tabs 100a and 100b to its first and second (engaged and disengaged) positions, respectively. That is, in one rotational position of sleeve 18 with respect to lock ring 80, cam surface 107 pushes lock ring 80 via tab 100a to the lock ring's first position, in which teeth 94 engage teeth 96. In the other rotational position of sleeve 18 with respect to lock ring 80, cam surface 109 pushes lock ring 80 to its second position, in which teeth 94 disengage from teeth 96.

The degree of relative rotation between sleeve 18 and lock ring 80 is defined by the difference in angular width between each of a pair of drive dogs 110 extending rearwardly from lip 108 and each of a pair of grooves 112 in the forward face of lock ring 80 that receives a respective dog 110.

During normal operation, when jaws 26 are in a retracted position so that they do not grip a tool shank, dogs 110 are received in respective grooves 112 so that each dog abuts an edge 114 of its respective groove 112, as shown in FIG. 3B. Thus, assuming the user turns sleeve 18 in the chuck's closing direction 116, dogs 110 abut the trailing edges 114 of their respective grooves 112. In this condition, cam surface 109 pushes lock ring 80 to its second position, so that teeth 94 are disengaged from teeth 96 (FIG. 3B). This permits lock ring 80, and therefore nut 28, to rotate with respect to the body so that the rotating nut drives jaws 26 in their respective passageways as described above. That is, rotation of sleeve 18 in direction 116 rotationally drives nut 28 through ring 74 to close the jaws.

The engagement of jaws 26 with a tool shank blocks the jaws' further forward movement in the jaw passageways, and nut 28 therefore resists further rotation. Lock ring 80 also stops rotating due to the rotational connection between the lock ring and the nut via tabs 100 and grooves 102. Application of sufficient torque to sleeve 18 in closing direction 116 to overcome the engagement of pawls 78 with ratchet teeth 81 causes the ratchet teeth to pass over the pawls. The pawls' radially inward movement over teeth 81 and into successive gaps between adjacent teeth produces a click sound notifying the user that the jaws have gripped the tool shank and that sufficient torque has been applied to nut 28 to overcome the engagement between pawls 78 and teeth 81.

As sleeve 18 rotates with respect to lock ring 80, dogs 110 move in grooves 112 from edges 114 to opposing edges 118. The length of this travel corresponds to the movement of sleeve 18 from its second position (FIG. 3B) with respect to lock ring 80 to its first position (FIG. 3A). As this transition occurs, cam surface 107 pushes lock ring 80 to its first position so that teeth 94 engage teeth 96. The radial distance of this movement is insufficient to disengage tabs 100a and 100b from grooves 102, and lock ring 80 remains rotationally fixed to the nut. Alternatively, each tab 100a, 100b may move out of its groove 102 at one of the first and second positions, but remains in the groove in the other position, such that at least one of the tabs 100a and 100b remains in its groove at all times and the lock ring remains rotationally fixed to the nut. Because lock ring 80 is now also rotationally fixed to ring 92 and the body through the engagement of teeth 94 with teeth 96, nut 28 is rotationally fixed to the body, thereby inhibiting the nut's undesired rotation during the power driver's operation. Teeth 94 and 96 may be angled such that they oppose each other in more direct opposition to the nut's rotation in the opening direction.

To open the chuck, the user grips and rotates sleeve 18 in the direction opposite direction 116 (opening direction 117). In the chuck's closed and tightened condition the engagement between nut threads 54 and jaw threads 44 is generally stronger than the engagement between pawls 78 and ratchet teeth 81. Thus, sleeve 18 again rotates with respect to annular ring 74 such that ratchet teeth 81 ride over pawls 78 and dogs 110 travel in their respective grooves 112 from edges 118 to edges 114 (FIG. 3B). This also moves cam surfaces 107 and 109 relative to lock ring 80 so that the cam surface 109 drives lock ring 80 back to the lock ring's second position. Teeth 94 are now disengaged from teeth 96, and further rotation of sleeve 18 in opening direction 117 carries lock ring 80 and nut 28 with the sleeve, thereby retracting jaws 26 in their passageways.

Figure 4:
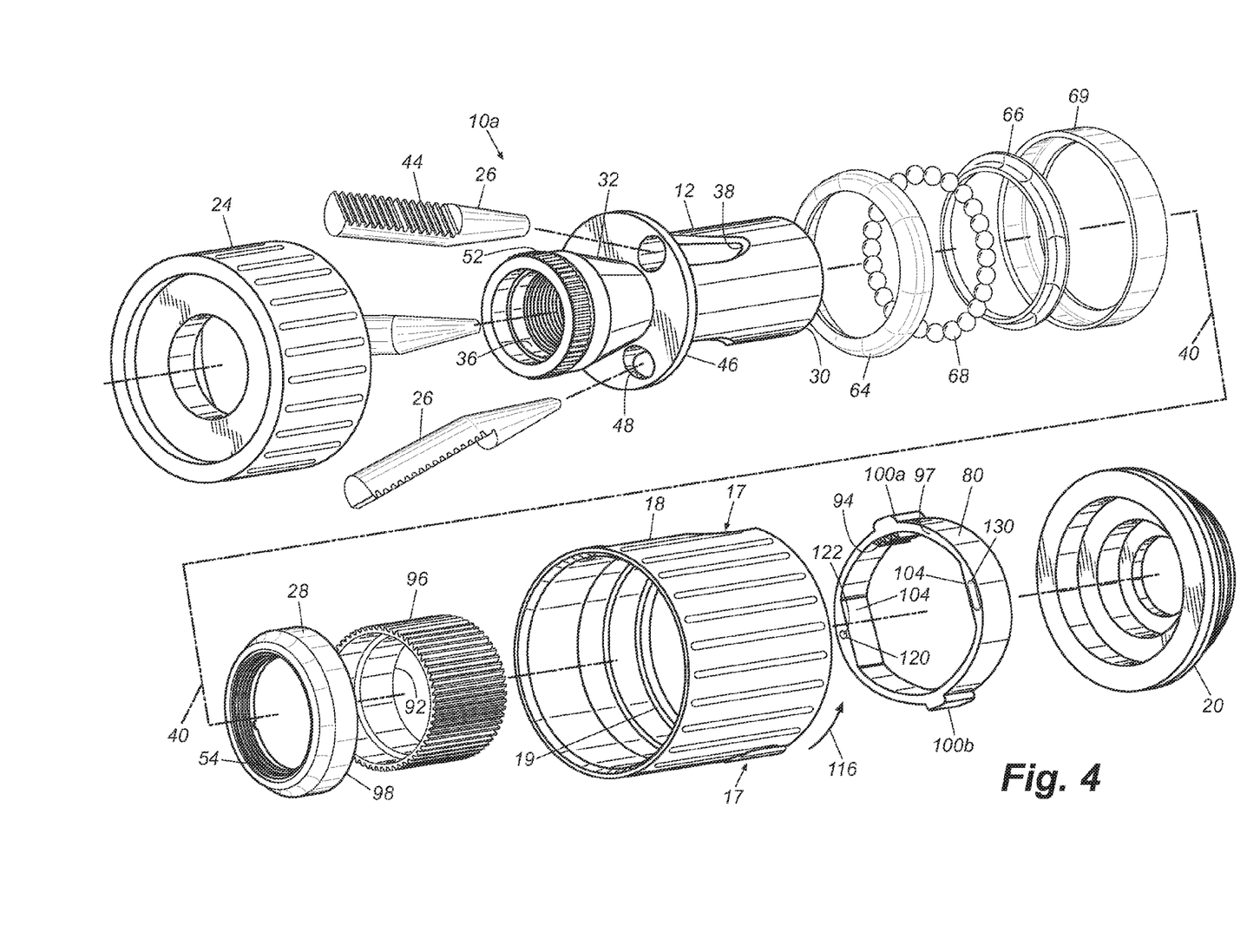
FIG. 4 is an exploded perspective view of a chuck in accordance with an embodiment of the present invention.
Figure 5:
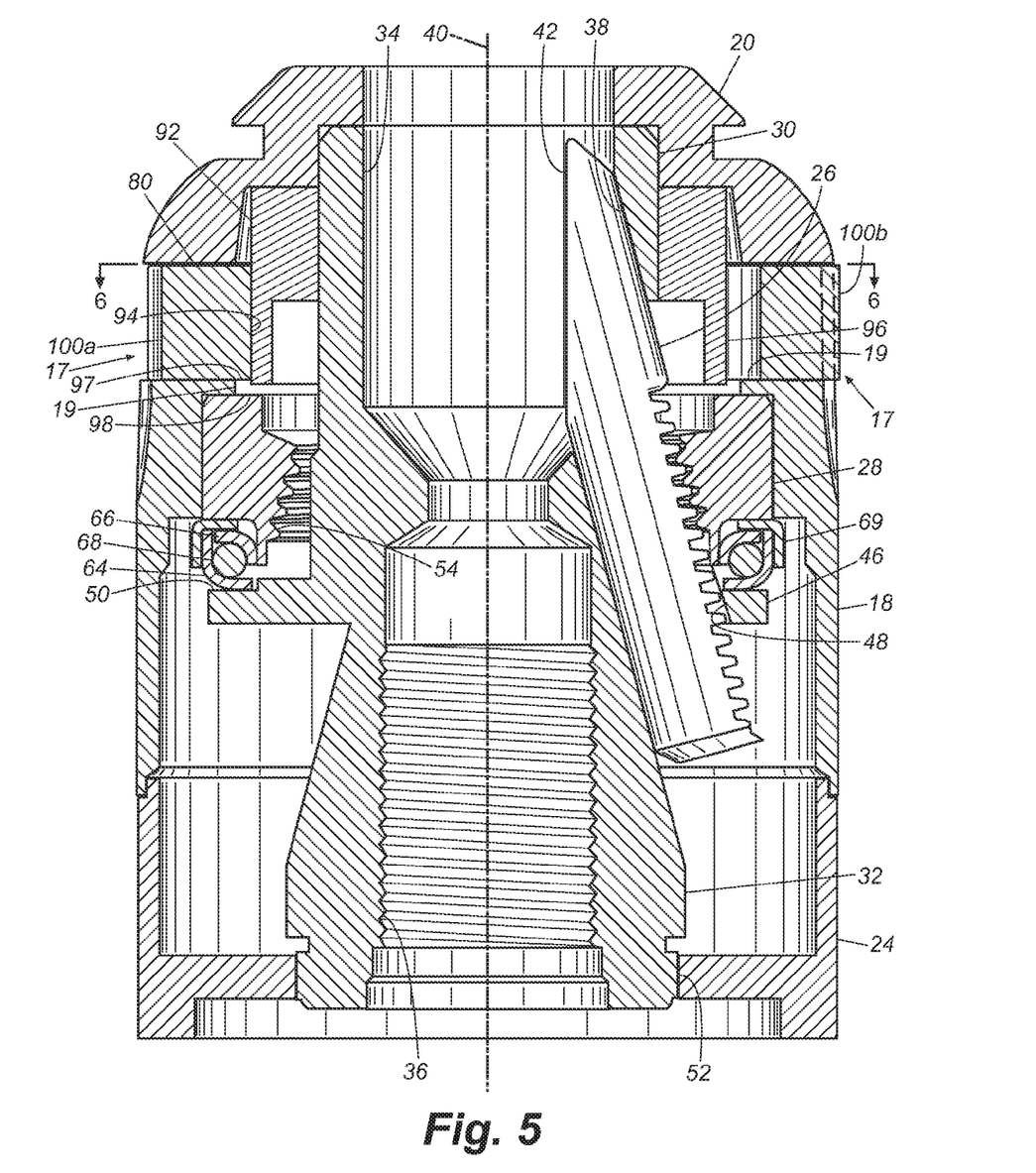
FIG. 5 is a longitudinal view, in cross-section, of the chuck shown in FIG. 4.

In an alternate embodiment, sleeve 18 and lock ring 80a of chuck 10a rotate together, and lock ring 80a is actuated manually rather than by relative rotation between the lock ring and the sleeve. The sleeve and nut 28 also rotate together, and ring 74, flange 86, ratchet teeth 81, dogs 110, grooves 112, and cam surfaces 107 and 109 are omitted. Sleeve 18 is preferably pressed onto the outer surface of nut 28 so that the sleeve is rotationally fixed to the nut. A self-contained bearing assembly is disposed between nut 28 and ledge portion 50 of body 14. A plurality of bearing balls 68 are positioned between an outer race 64 and an inner race 66, and a shroud 69 secures the two races together.

Figure 6A:
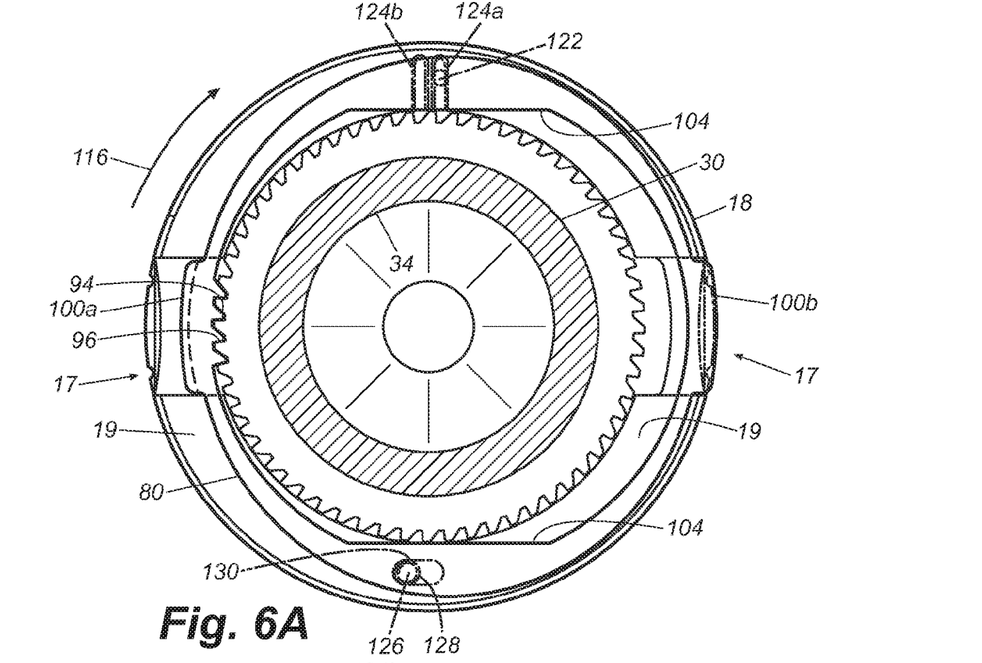
FIG. 6A is a cross-sectional view of the chuck shown in FIG. 5 along line 6-6.
Figure 6B:
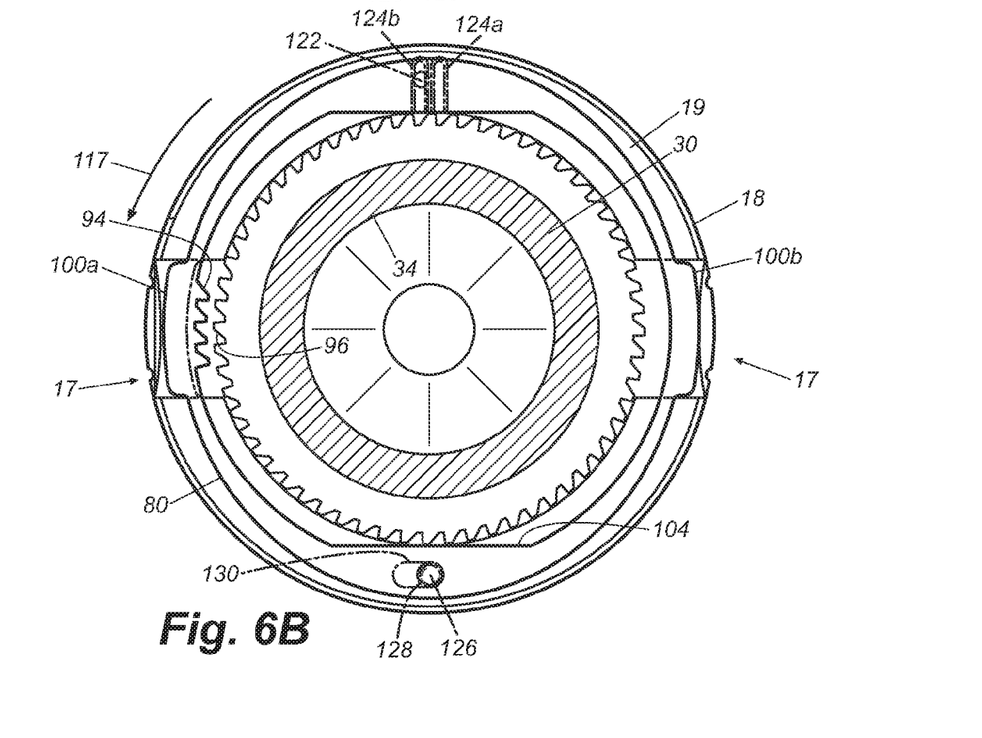
FIG. 6B is a cross-sectional view of the chuck shown in FIG. 5 along line 6-6.

Flats 104 remain on lock ring 80a and ride on the outer surface of teeth 96 as the lock ring moves radially between its first and second positions with respect to chuck axis 40. Tabs 100a and 100b extend slightly further radially outward and through respective apertures 17 in sleeve 18 so that lock ring 80a may be selectively actuated to either the first "locked" (FIG. 6A) or second "unlocked" (FIG. 6B) position through pressing of tabs 100a and 100b by the user's thumb.

Lock ring 80a is not rotationally keyed to nut 28 through tabs 100a and 100b. Thus, grooves 102 are omitted from the outer surface of nut 28, and tabs 100a and 100b do not extend rearward of lock ring face 97. An annular lip 19 extends radially inward from the inner circumference of sleeve 18 between opposing faces 97 and 98 of lock ring 80 and the nut 28, respectively, so that the lock ring's rear face 97 is flush against lip 19. A blind bore 120 extends into rear face 97 above one of flats 104 parallel to chuck axis 40 and receives a first ball and spring detent 122. The ball extends partially out of the blind bore and engages either of two grooves 124a, 124b in the opposing forward face of annular lip 19, depending on whether the lock ring is in its first (FIG. 3A) or second (FIG. 3B) position. That is, the ball engages a first 124a of the two grooves when the lock ring is in its first position. When the user pushes the lock ring to its second position, the ring's radial movement causes the ball to move over a ridge separating the two grooves and into second groove 124b when the lock ring reaches its second position. Thus, first ball detent 122 retains the lock ring in one of its two radial positions.

Lock ring 80*a* is rotationally fixed to sleeve 18 through a second spring and ball detent 126 (FIGS. 6A and 6B) in annular lip 19. A blind bore 128 extends into the forward face of annular lip 19 parallel to chuck axis 40 and receives second spring and ball detent 126 so that the spring biases the ball forward from the mouth of the bore and toward rear face 97 of lock ring 80*a* at a point radially outward of the opposite flat 104. A blind slot 130 extends into rear face 97 at this point. Slot 130 has a width in the radial direction with respect to chuck axis 40 so that the ball, which is biased outward from the front face of annular lip 19, is received partially in slot 130 and partially in the blind bore in the lip. The blind slot in rear face 97 has a width perpendicular to chuck axis 40 to accommodate the lock ring's radial travel between its two positions.

In alternate embodiments, slot 130 and second ball detent 126 may be omitted. In those embodiments, tabs 100*a* and 100*b* can be extended beyond rear face 97 of lock ring 80*a* so that they are received in corresponding grooves formed in the sleeve. Interaction of tabs 100*a* and 100*b* with the grooves prevents rotation of lock ring 80 relative to sleeve 18. In yet another embodiment, tabs 100*a* and 100*b* can be extended radially outward so that they both extend through their respective apertures 17 in sleeve when in both the first and second positions. As such, lock ring 80*a* is rotationally fixed to sleeve 18.

During normal operation, when jaws 26 are in a retracted position so that they do not grip a tool shank, the user can press the tab 100*b* opposite teeth 94 so that lock ring 80*a* moves to the second position (FIG. 3B) and teeth 94 are disengaged from teeth 96. As noted above, first ball detent 122 engages second groove 124*b* and retains the lock ring in this position.

Because teeth 94 are disengaged from teeth 96, lock ring 80*a* and, therefore, sleeve 18 and nut 28 may rotate with respect to the body so that the rotating nut drives jaws 26 in their respective passageways as described above. That is, rotation of sleeve 18 in direction 116 rotationally drives nut 28 to close the jaws.

The engagement of jaws 26 with a tool shank blocks the jaws' further forward movement in the jaw passageways, and nut 28 therefore resists further rotation. Because sleeve 18 is pressed to the nut, the sleeve also stops rotating when the user has applied as much tightening torque to the nut through the sleeve as desired. The user may then apply thumb pressure to tab 100*a* at which teeth 94 are disposed so that lock ring 80*a* shifts to its first position (FIG. 3A), whereby teeth 94 engage teeth 96. Again, first ball detent 122 engages first groove 124*a* and retains lock ring 80*a* in this position until the user again actuates the ring.

Since second ball detent 126 rotationally fixes the lock ring to the sleeve, and since sleeve 18 is rotationally fixed to nut 28 by press fit, the engagement between teeth 94 and teeth 96 rotationally locks the nut to the body, thereby inhibiting the nut's undesired rotation during the power driver's operation. Teeth 94 and 96 may be angled such that they oppose each other in more direct opposition to the nut's rotation in the opening direction.

To open the chuck, the user actuates lock ring 80 at the tab 100*b* opposite teeth 94 so that the lock ring returns to its second position (FIG. 3B). Teeth 94 are now disengaged from teeth 96, and rotation of sleeve 18 in opening direction 117 carries nut 28 with the sleeve, thereby retracting jaws 26 in their passageways.

While one or more preferred embodiments of the present invention have been described above, it should be understood that any and all equivalent realizations of the present invention are included within the scope and spirit thereof. Thus, the depicted embodiment(s) are presented by way of example only and are not intended as limitations on the present invention. It should be understood that aspects of the various one or more embodiments may be interchanged in whole or in part. Therefore, it is contemplated that any and all such embodiments are included in the present invention as may fall within the scope of the present disclosure.

What is claimed is:

1. A chuck for use with a manual or powered driver having a rotatable drive shaft, said chuck comprising:
   a generally cylindrical body having a nose section, a tail section and a first set of locking teeth on said body, said nose section having an axial bore formed therein;
   a plurality of jaws movably disposed with respect to said body and in communication with said axial bore;
   a nut rotatably mounted about said body such that rotation of said nut in a closing direction moves said jaws toward a longitudinal center axis of said axial bore and rotation of said nut in an opening direction moves said jaws away from said longitudinal center axis;
   a first sleeve rotatably mounted about said body, said first sleeve being rotatable over a limited angular distance between a first angular position and a second angular position with respect to said nut; and
   a second sleeve rotatably mounted to said body and rotatably fixed to said nut, said second sleeve including a first portion, a second portion and a second set of locking teeth disposed on one of said first portion and said second portion of said second sleeve, each said first and second portions being movable in a direction transverse to said longitudinal center axis,
   wherein said first portion of said second sleeve moves radially outward away from said longitudinal center axis and said second portion of said second sleeve moves radially inward toward said longitudinal center axis when said first sleeve transitions from said first angular position to said second angular position.

2. The chuck as in claim 1, wherein when said first sleeve is in said first angular position said chuck is in a first state in which said nut is rotatable about said body and when said first sleeve is in a second angular position said chuck is in a second state in which said nut is rotatably fixed to said body.

3. The chuck as in claim 1, wherein one of said first sleeve and said second sleeve further comprises a tab and the other of said first sleeve and said second sleeve defines a camming surface, said tab engaging said camming surface when said first sleeve is rotated from said first angular position to said second angular position.

4. The chuck as in claim 3, wherein said tab and said second set of locking teeth are disposed on said second portion of said second sleeve.

5. The chuck as in claim 4, wherein said camming surface is disposed on said first sleeve.

6. The chuck as in claim 1, wherein rotation of said first sleeve in said closing direction moves said jaws toward said longitudinal center axis of said axial bore and rotation of said first sleeve in said opening direction moves said jaws away from said longitudinal center axis.

7. The chuck as in claim 1, wherein said first portion of said second sleeve moves along a first radial axis and said second portion of said second sleeve moves along a second radial axis.

8. The chuck as in claim 7, wherein said first radial axis and said second radial axis are parallel.

9. A chuck for use with a manual or powered driver having a rotatable drive shaft, said chuck comprising:
- a generally cylindrical body having a nose section and a tail section, said body being configured to rotate with said drive shaft and said nose section having an axial bore formed therein;
- a plurality of jaws movably disposed with respect to said body and in communication with said axial bore;
- a first set of locking teeth disposed on said body;
- a nut rotatably mounted about said body such that rotation of said nut in a closing direction moves said jaws toward a longitudinal center axis of said axial bore and rotation of said nut in an opening direction moves said jaws away from said longitudinal center axis;
- a first sleeve rotatably mounted to said body, said first sleeve being rotatable over a limited angular distance between a first angular position and a second angular position with respect to said nut; and
- a second sleeve rotatably mounted about said body, said second sleeve including a first portion and a second portion, each said first and second portions being movable in a direction transverse to said longitudinal center axis, one of said first portion and said second portion including a second set of locking teeth,
wherein one of said first portion and said second portion of said second sleeve moves radially outward away from said longitudinal center axis and the other of said first portion and said second portion of said second sleeve moves radially inward toward said longitudinal center axis when said first sleeve transitions from said first angular position to said second angular position.

10. The chuck as in claim 9, wherein when said first sleeve is in said first angular position said chuck is in a first state in which said nut is rotatable about said body and when said first sleeve is in said second angular position said chuck is in a second state in which said nut is rotatably fixed to said body.

11. The chuck as in claim 9, wherein when said first sleeve is in said second angular position, said second set of locking teeth engages said first set of locking teeth.

12. The chuck as in claim 9, wherein said second set of locking teeth is disposed on said second portion of said second sleeve.

13. The chuck as in claim 9, wherein rotation of said first sleeve in said closing direction moves said jaws toward said longitudinal center axis of said axial bore and rotation of said first sleeve in said opening direction moves said jaws away from said longitudinal center axis.

* * * * *